(12) United States Patent
Cantatore (10) Patent No.: US 7,253,718 B2
(45) Date of Patent: Aug. 7, 2007

(54) TRANSPONDER (75) Inventor: Eugenio Cantatore, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 270 days.

(21) Appl. No.: 10/499,268

(22) PCT Filed: Nov. 27, 2002

(86) PCT No.: PCT/IB02/04999

§ 371 (c)(1),
(2), (4) Date: Jun. 18, 2004

(87) PCT Pub. No.: WO03/056508

PCT Pub. Date: Jul. 10, 2003

(65) Prior Publication Data

US 2005/0093680 A1 May 5, 2005

(30) Foreign Application Priority Data

Dec. 24, 2001 (EP) .................................. 01205080

(51) Int. Cl.
*H04Q 5/22* (2006.01)

(52) U.S. Cl. ................. 340/10.4; 340/10.1; 340/10.51; 340/10.34; 340/572.4; 340/572.1; 340/10.5; 340/825.69; 340/825.72

(58) Field of Classification Search ............... 340/10.4, 340/10.1, 10.51, 10.34, 572.4, 572.1, 10.5, 340/825.69, 825.72
See application file for complete search history.

(56) References Cited

U.S. PATENT DOCUMENTS 5,345,231 A * 9/1994 Koo et al. ............. 340/870.31
5,973,598 A * 10/1999 Beigel ..................... 340/572.1
6,778,070 B1 * 8/2004 Thomas ..................... 340/10.1
2005/0012620 A1 * 1/2005 Yoakum .................. 340/572.8

* cited by examiner

*Primary Examiner*—Brian Zimmerman
*Assistant Examiner*—Vernal Brown
(74) *Attorney, Agent, or Firm*—Adam L. Stroud (57) ABSTRACT

An identification transponder (IDT) for supplying an identification code to a base station (BS) varies an RF signal transmitted by the base station (BS) in a rhythm that corresponds to the identification code. The identification transponder (IDT) has identification code generation means (IDCG) for generating the identification code, rectifier means (RTF) for AC coupling with the base station (BS) for applying a supply voltage (V1) to the identification code generation means (IDCG), a modulation transistor (TM), voltage adaptation means (VADPT) for adapting the voltage levels of the identification code and for supplying the code with adapted voltage levels to a control terminal of the modulation transistor (TM), and further rectifier means (FRTF) for the aforementioned AC coupling to the base station (BS) for applying a separate supply voltage (V2) to the voltage adaptation means (VADPT). The modulation transistor (TM) may perform two tasks: the task of rectifying the RF signal, and the task of supplying a variable load to the rectifier means (RTF). The variable load varies in the rhythm. As a consequence, the input current of the rectifier means (RTF) is varied in the rhythm, which in its turn varies the RF signal. This variation in the RF signal is detected in the base station (BS).

7 Claims, 9 Drawing Sheets

TRANSPONDER

The invention relates to a transponder for supplying a code to a base station by varying a radio-frequency signal coming from the base station in a rhythm that corresponds to the code.

Figure 1:
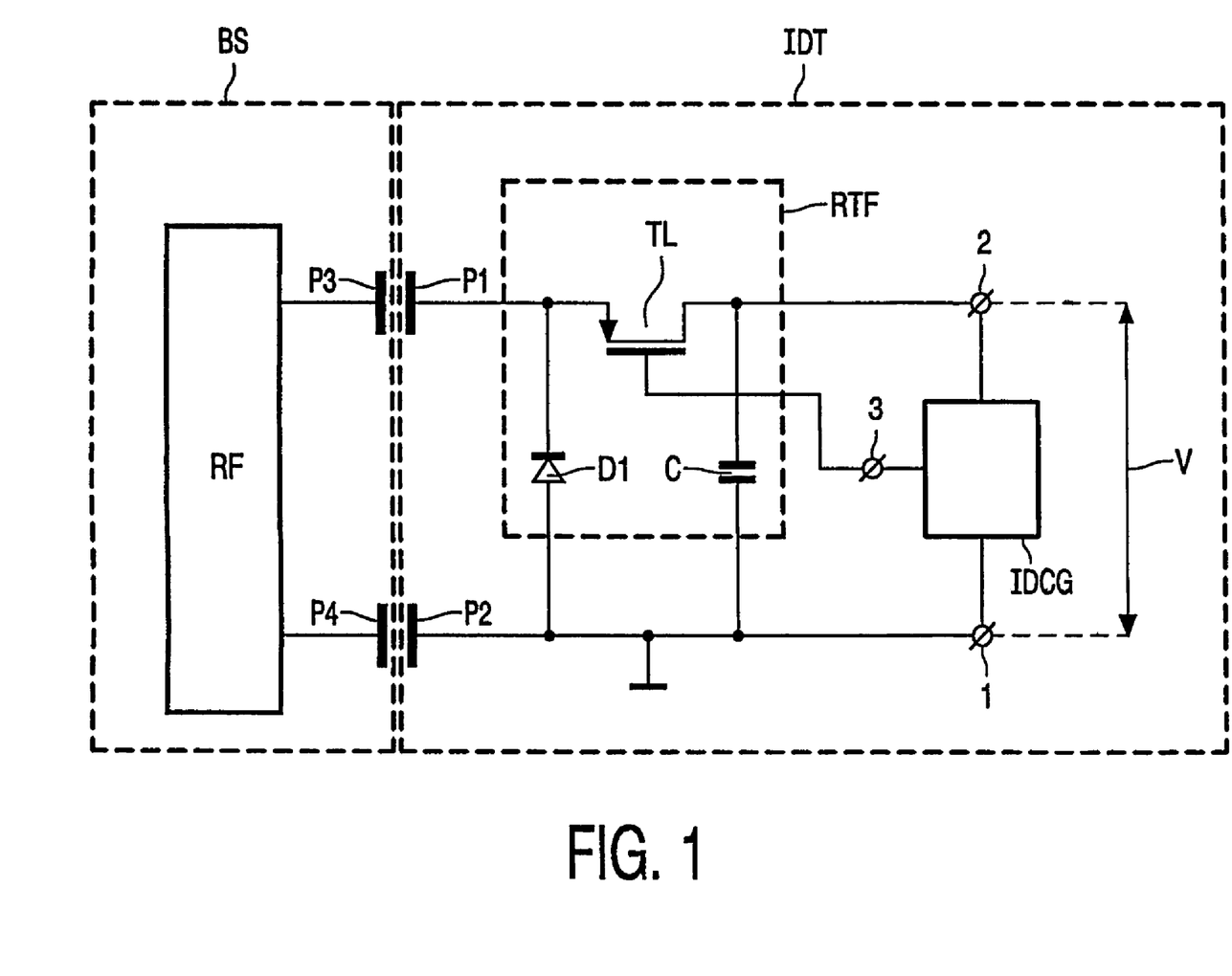
FIG. 1 shows an identification transponder as described in EP01/09620.

Published international patent application EP01/09620 filed on Aug. 13, 2001 (WO/2002/017223) describes an identification transponder which, together with a base station, or a scanner, is represented in FIG. 1. The base station BS emits an RF signal of which a portion is supplied to a rectifier RTF by means of a coupling P1; P3, P2; P4, a capacitive coupling in this case, which rectifier RTF is formed by diodes D1 and load transistor TL, and a smoothing capacitor C. An a result, a supply voltage V is available between the output terminals 1 and 2 of the rectifier RTF. The identification transponder IDT further includes an identification code generator IDCG which comprises a so-called read only memory (ROM) and a modulator, which arc both Fed with the supply voltage V. The load transistor TL is coupled with a main current path between pad P1 and output terminal 2. During operation the identification code generator IDCG sends a serial bit pattern to a control electrode of the load transistor TL. The serial bit pattern is determined by the data that is stored in the ROM. As a result, the load between the output terminals 1 and 2 is varied in the rhythm of the serial bit pattern. The input current of the rectifier RTF is consequently varied in the rhythm mentioned above. This rhythm can be detected by the base station BS by means of the coupling P1; P3, P2; P4. For example, the ROM maybe a bar code on an object, which code contains information about the object, for example, the price of the object. This information is transferred to the base station BS via a temporary coupling with the base station BS. The identification transponder IDT may be arranged for example in an integrated circuit which is made from organic materials, for example polymers. This offers the advantage that an identification transponder can be manufactured with this having a small thickness and large mechanical flexibility. In general, but particularly when electronic circuits are manufactured from organic materials, it is advantageous to minimize the number of electronic components required. In the identification transponder IDT shown in FIG. 1 the load transistor TL therefore percents a dual function, that is, the function of a variable load and the function of a rectifier element. This saves one electronic component. After all, the rectifier RTF then needs one diode less while (for this reason) no extra components have been added to the electronic circuit elsewhere.

It is an object of the invention to enhance the efficiency of the transponder or increase the modulation depth of the RF signal.

The invention hereto provides a transponder for supplying a code to a base station by varying a radio-frequency signal coming from the base station in a rhythm corresponding to the code, the transponder comprising identification code generation means for generating the code; rectifier means which are arranged for AC coupling with the radio-frequency signal for applying a supply voltage to the generation means, and which rectifier means comprise at least one circuit acting as a rectifier; a modulation transistor having a main current path, and comprising a control electrode which is coupled for the reception of the code for producing a variable load of the rectifier means as a result of which the radio-frequency signal varies with said rhythm, at least one of the circuits acting as a rectifier comprising the main current path of the modulation transistor; voltage adaptation means for adapting the voltage levels of the code and for supplying the code with the adapted voltage levels to the control electrode of the modulation transistor; and further rectifier means for applying a separate supply voltage to the voltage adaptation means.

It has appeared that the modulation depth of the RF signal strongly depends on the voltage levels of the (code) signal on the control electrode of the modulation transistor (the latter corresponding to the load transistor TL in FIG. 1). This particularly holds for the application of electronic components which are made of organic materials, such as polymers. In the transponder as described in EP01/09620 these voltage levels are directly coupled with the voltage which is supplied by the rectifier. By applying the further rectifier means and the voltage adaptation means in a transponder according to the invention, said voltage levels may be freely dimensioned, i.e. independently of the supply voltage which is applied to the (identification code) generation means by the rectifier means. As a result, a higher efficiency or a larger modulation depth of the RF signal can be produced.

Further advantageous embodiments of the invention are specified in claims 2 to 7.

The invention will now be further discussed with reference to the appended drawing in which.

Like components or elements in these Figures are referred to by like reference signs.

Figure 2:
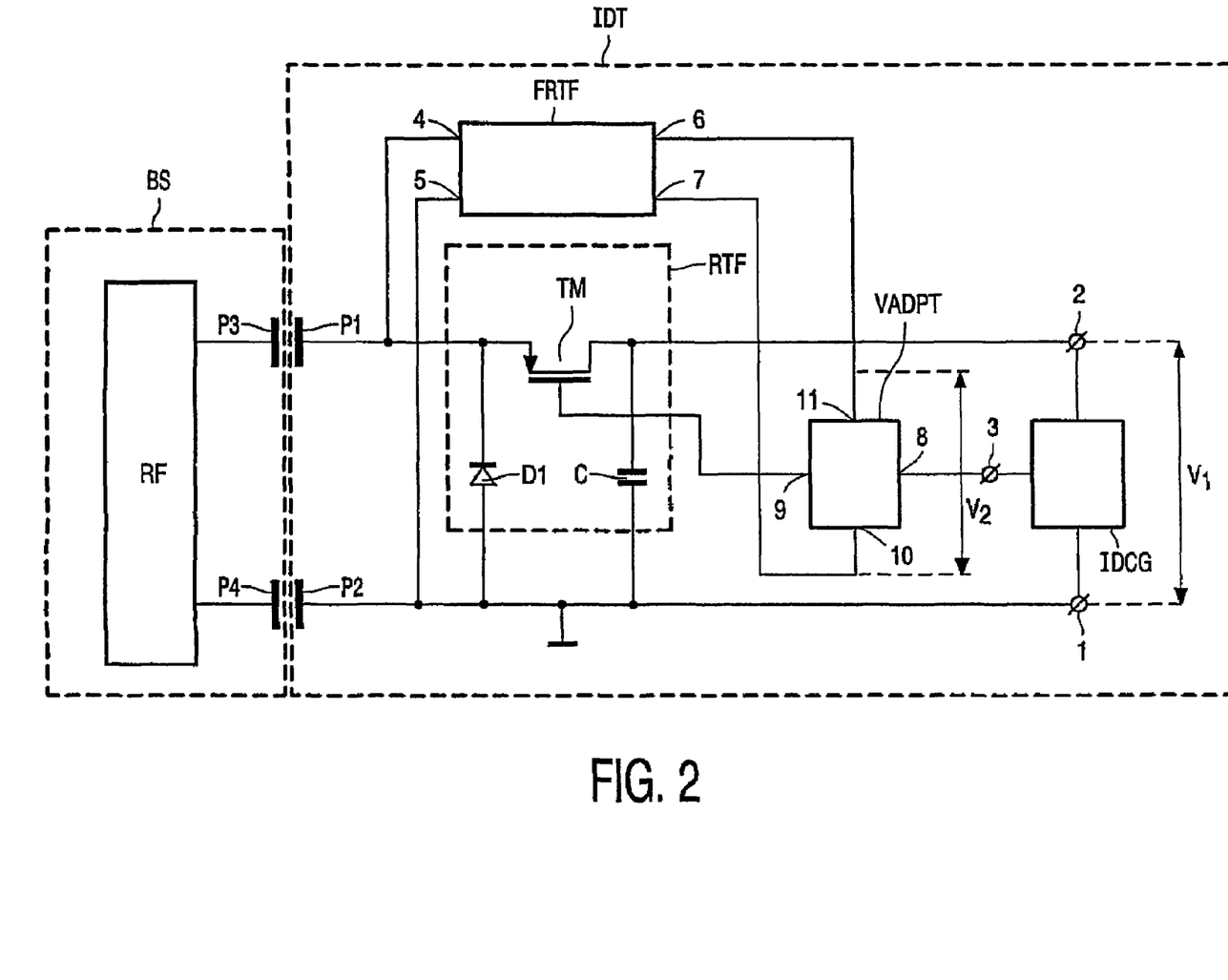
FIG. 2 shows a circuit diagram of a first embodiment of an identification transponder according to the invention.

FIG. 2 shows a circuit diagram of a first embodiment of an identification transponder IDT according to the invention. FIG. 2 also shows diagrammatically a base station BS for transmitting an RF signal. The identification transponder IDT comprises an electrically conductive pad P1 to be coupled with an electrically conductive pad P3 of the base station BS, and an electrically conductive pad P2 to be coupled with an electrically conductive pad P4 of the base station BS. The identification transponder IDT further comprises rectifier means RTF, further rectifier means FRTF, voltage adaptation means VADPT and identification code generation means IDCG. The rectifier means RTF comprise a diode D1, a modulation field effect transistor TM, and a smoothing capacitor C. The diode D1 is connected by a cathode and an anode to the electrically conductive pad P1 and the electrically conductive pad P2, respectively. A first supply terminal 1 of the identification code generation means IDCG is connected to the second electrically conductive pad P2. A source of the modulation transistor TM is connected to the electrically conductive pad P1. A drain of the modulation transistor TM is connected to a second supply terminal 2 of the identification code generation means IDCG. The smoothing capacitor C is connected between the first supply terminal 1 and the second supply terminal 2. The supply voltage between the first supply terminal 1 and the second supply terminal 2 is referred to as $V_1$. A signal output terminal 3 of the identification code generation means IDCG is coupled with an input 8 of the voltage adaptation means VADPT. An output 9 of the voltage adaptation means VADPT is coupled with a gate of the modulation transistor TM. There is a further supply voltage $V_2$ present between the connection points 11 and 10 of the voltage adaptation means VADPT, which further supply voltage $V_2$ is produced by the further rectifier means FRTF by a coupling of the connection points 6 and 7 of the further rectifier means FRTF with connection points 11 and 10, respectively, of the voltage adaptation means VADPT. Connection points 4 and 5 of the voltage adaptation means VADPT are connected to the electrically conductive pad P1 and the electrically conductive pad P2.

The electronic system as shown in FIG. 2 operates as follows. The electrically conductive contact pads P1 to P4 constitute a capacitive coupling between the base station RF and the identification transponder IDT. As a result, a portion of the RF signal is supplied to the rectifier means RTF and to the further rectifier means FRTF. The purpose of the further rectifier means FRTF is to be able to apply the further supply voltage $V_2$ to the voltage adaptation means VADPT, there being a possibility of selecting the value of the further supply voltage $V_2$ to be different than the value of the supply voltage $V_1$. The portion of the RF signal that is supplied to the further rectifier means FRTF is usually much smaller than the portion of the RF signal that is supplied to the rectifier means RTF. The voltage adaptation means VADPT supply a code signal between the signal output terminal 3 and the first supply terminal 1. The voltage adaptation means VADPT adapt the voltage levels of the code signal. The code signal with adapted voltage levels is supplied to the connection point 9 and is thus applied to the gate of the modulation transistor TM. The conduction of the modulation transistor TM varies in dependence on the voltage-adapted code signal. If the modulation transistor TM is conductive, it takes over the function of a diode, such as diode D2 in FIG. 7. The function of diode D1 is to provide that the average current flowing to or from the electrically conductive pads P1 to P4 is equal to zero on average. This avoids a DC voltage building up between the conductive pads P1 and P3 and between P2 and P4, respectively. This would stagnate the operation of the identification transponder IDT. The rectified RF signal is smoothed by the smoothing capacitor C. Consequently, there is a substantially constant supply voltage $V_1$ between the first and the second supply terminal 1 and 2 of the identification code generation means IDCG. The load of the rectifier means RTF is not only determined by the identification code generation means IDCG, but also by the modulation transistor TM. The identification code generation means IDCG are arranged for supplying the code signal on the signal output terminal 3. This signal varies in a rhythm that corresponds to an identification code. The identification code represents, for example, the price of an object to be scanned. Since the variable signal is finally applied to the gate of the modulation transistor TM (via the voltage-level-adapted code signal), the conduction of the modulation transistor TM also varies in the rhythm corresponding to the identification code. In consequence, the amount of the RF signal that is extracted from the base station BS is also varied in said rhythm. This variation in the RF signal may be detected in known manner, for example in the way as shown in FIG. 2 of international patent application having publication number WO99/30432.

Figure 6:
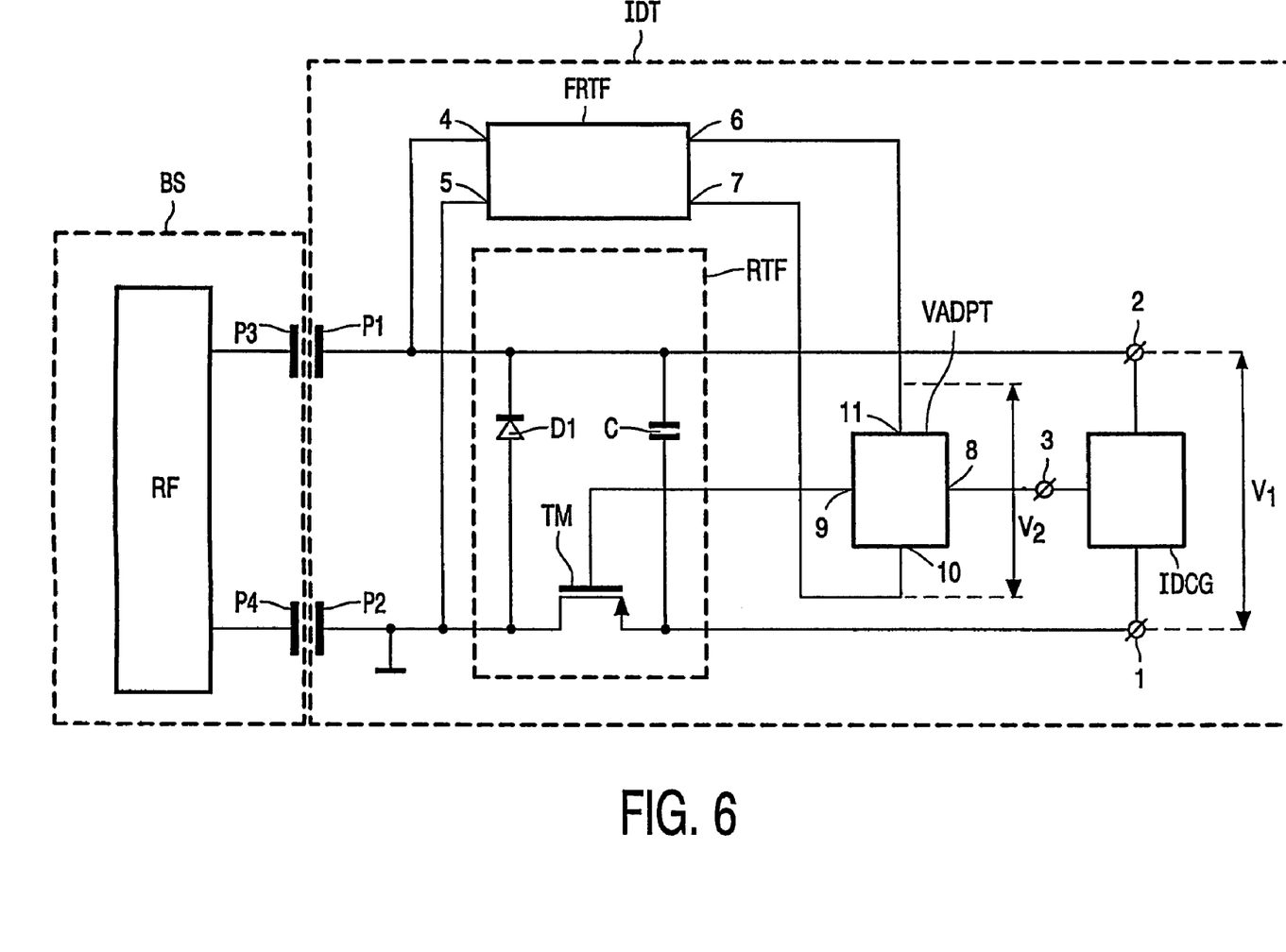
FIG. 6 shows a circuit diagram of a second embodiment of an identification transponder according to the invention.

Also the circuit diagram of FIG. 6, in which the main current path of the modulation transistor TM is connected between the electrically conductive pad P2 and the supply terminal 1, in lieu of being connected between the electrically conductive pad P1 and the supply terminal 2, may be used as an equivalent alternative to the circuit diagram shown in FIG. 2.

Figure 7:
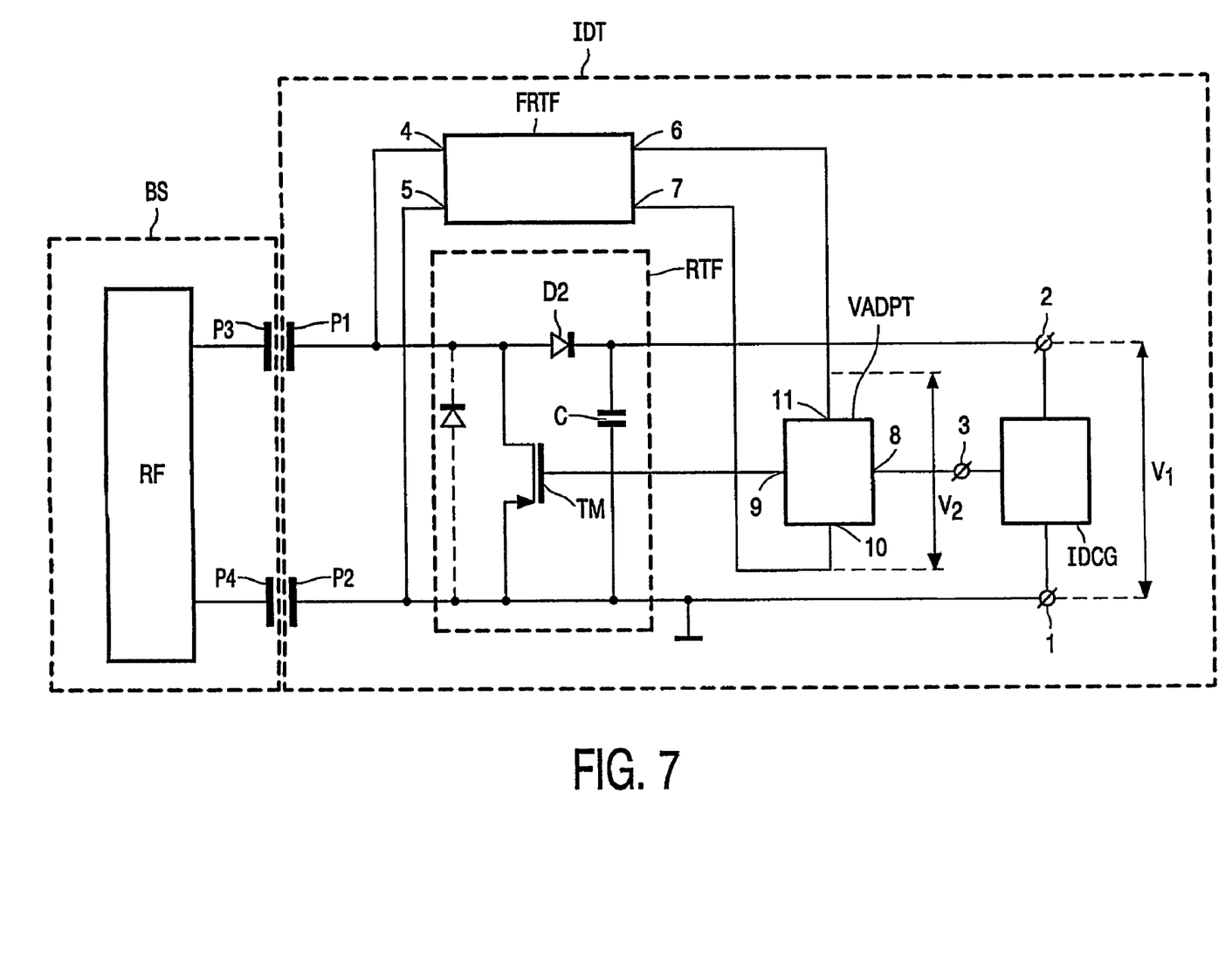
FIG. 7 shows a circuit diagram of a third embodiment of an identification transponder according to the invention.

FIG. 7 shows a circuit diagram of an embodiment according to the invention in which not the function of diode D2 (see for example FIG. 7) is taken over by the modulation transistor TM, as is the case in FIGS. 2 and 6, but in which the function of diode D1 (see for example FIG. 2) is taken over by the modulation transistor TM.

Figure 8:
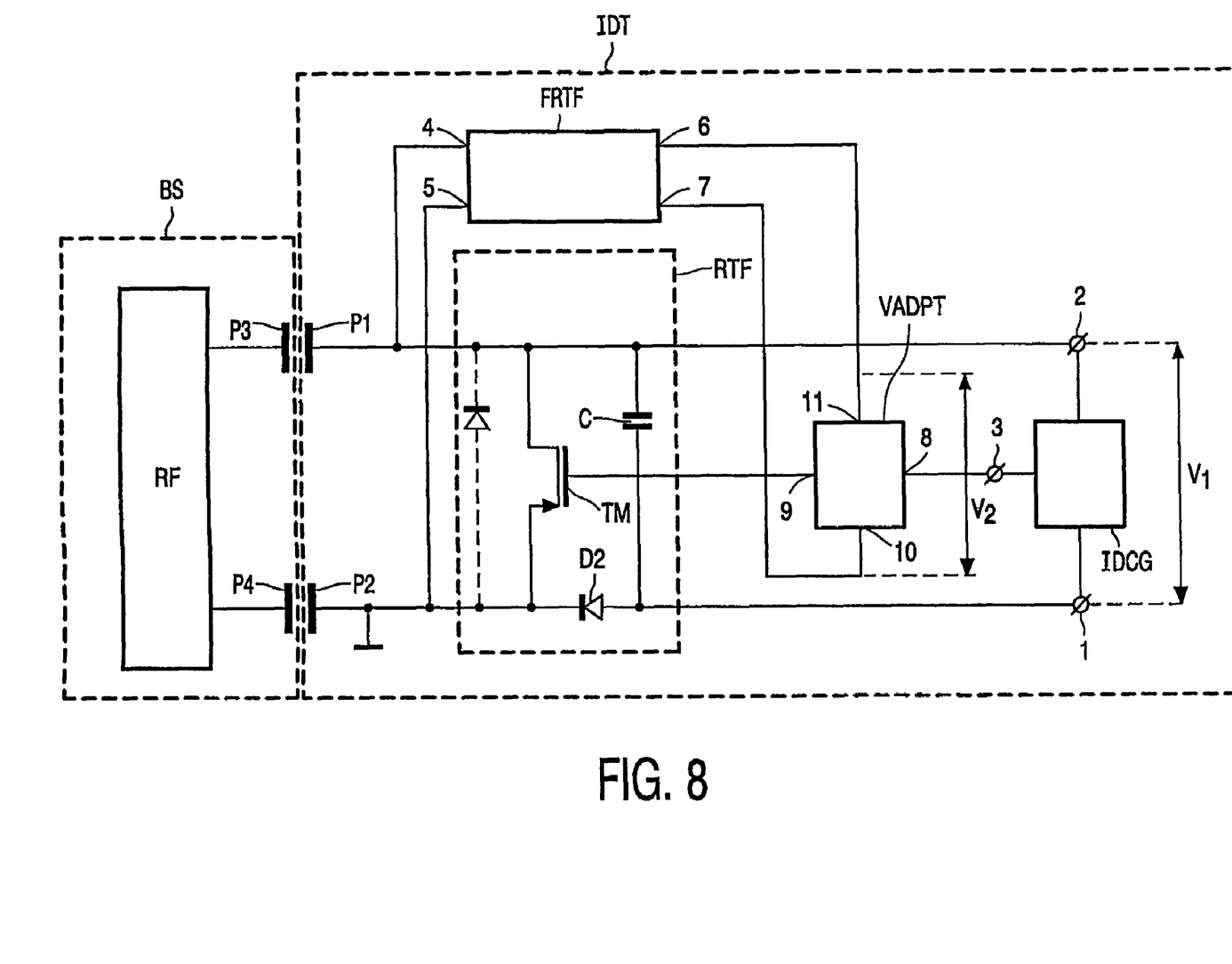
FIG. 8 shows a circuit diagram of a fourth embodiment of an identification transponder according to the invention.

FIG. 8 shows a circuit diagram, which forms an equivalent alternative for the circuit diagram of FIG. 7. The diode D2 is then connected between the conductive pad P2 and the supply terminal 1 in lieu of between the conductive pad P1 and the supply terminal 2.

Figure 9:
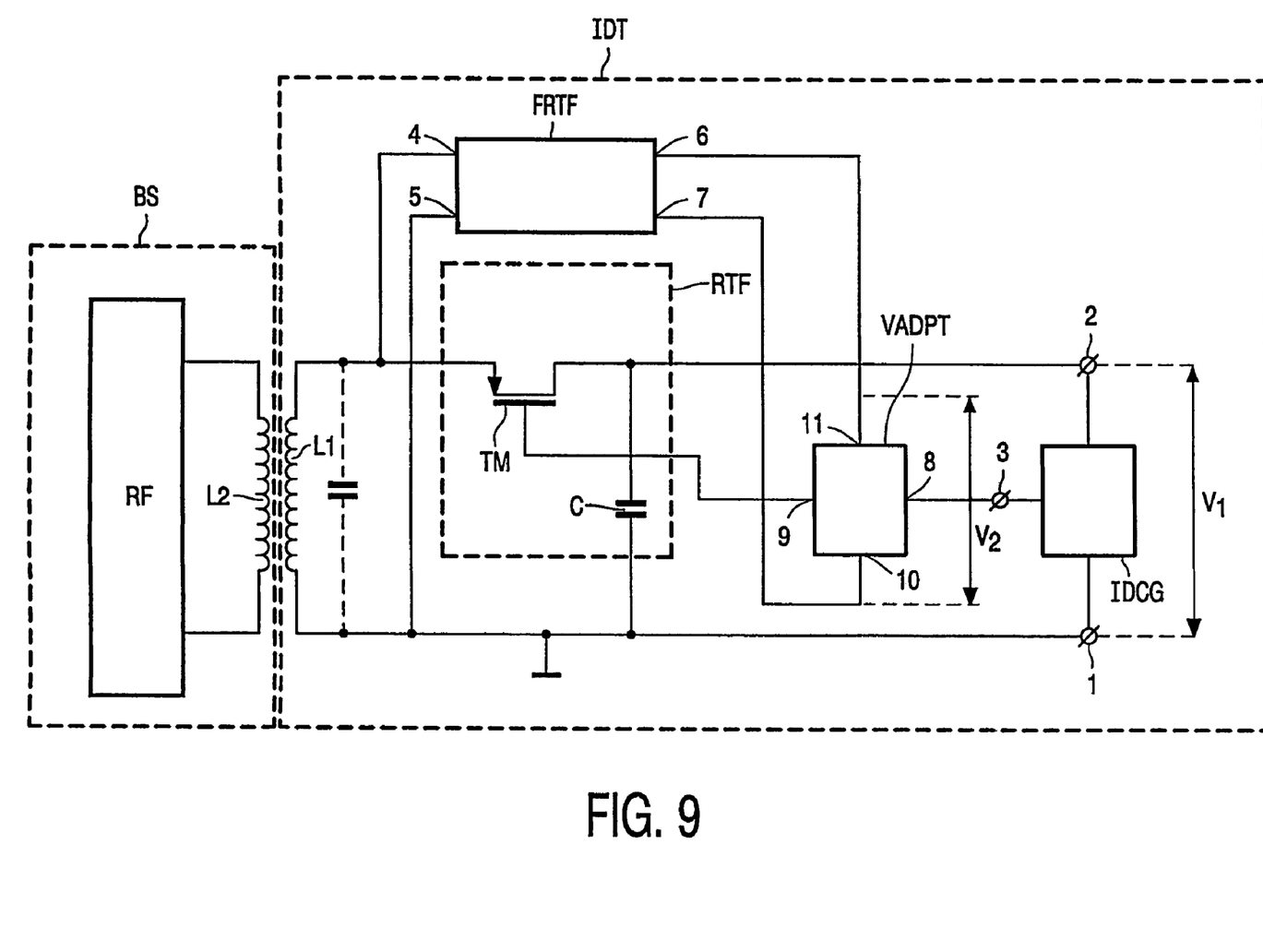
FIG. 9 shows a circuit diagram of a fifth embodiment of an identification transponder according to the invention.
Figure 10:
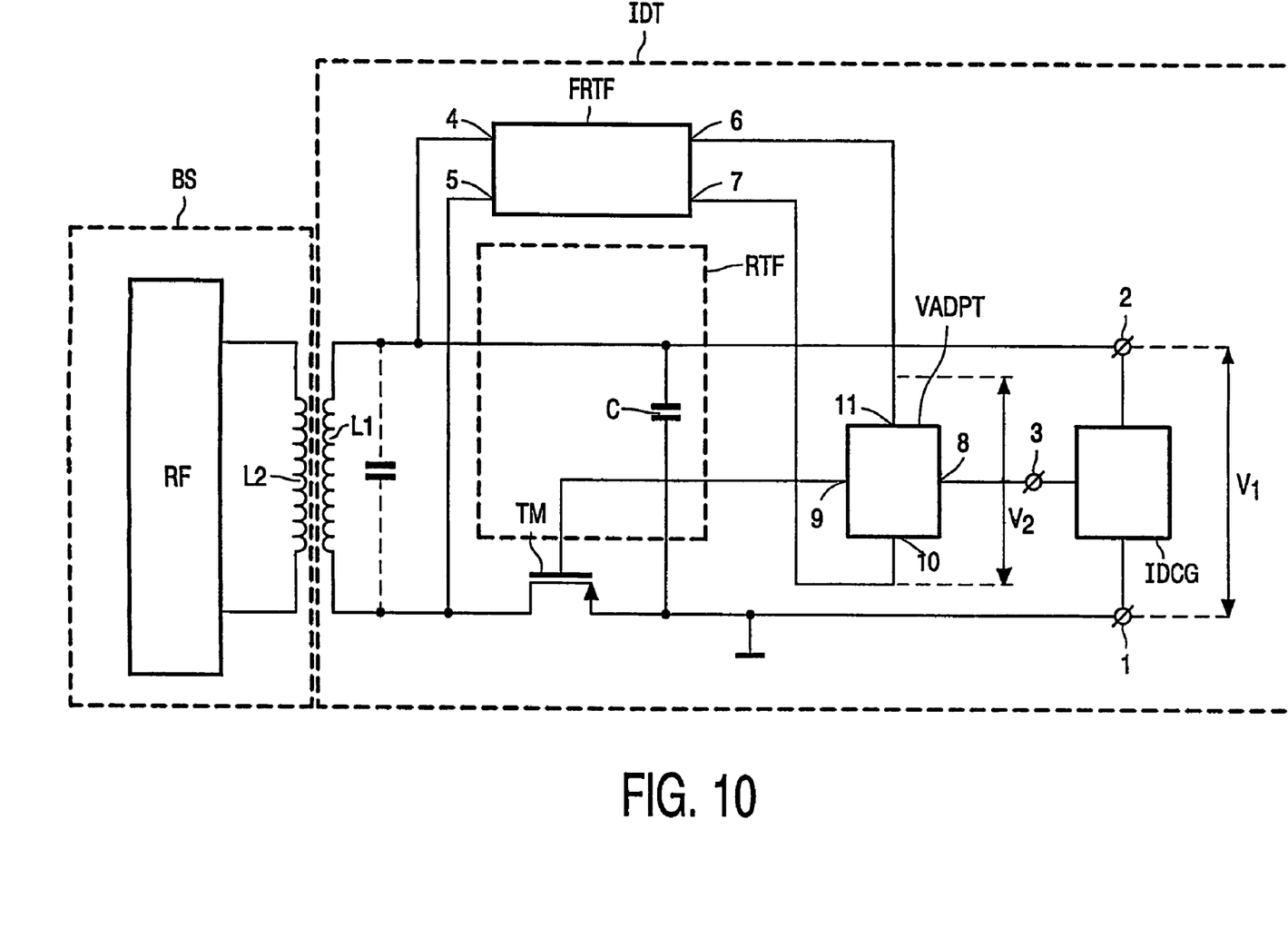
FIG. 10 shows a circuit diagram of a sixth embodiment of an identification transponder according to the invention.

FIGS. 9 and 10 show circuit diagrams of embodiments according to the invention which correspond to the embodiments as shown in FIGS. 2 and 6 respectively, on the understanding that the coupling between the base station BS and the identification transponder IDT is not achieved in a capacitive way but in an inductive way. For this purpose a coil L1 of the identification transponder IDT is coupled with a coil L2 of the base station BS. As a result of the inductive coupling, the diode D1 as shown in FIGS. 2 and 6 is redundant in the circuit diagrams as shown in FIGS. 9 and 10.

Figure 3:
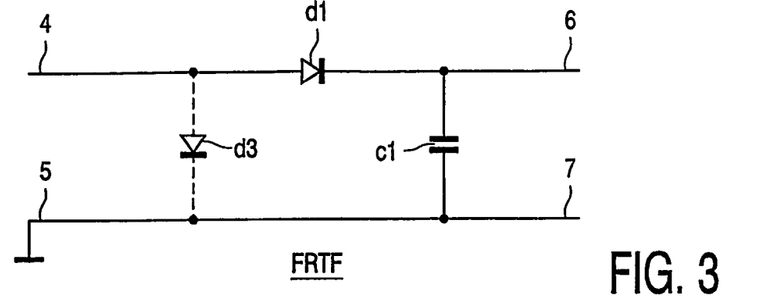
FIG. 3 shows a circuit diagram of a first embodiment of the further rectifier means to be used in a transponder according to the invention.

FIG. 3 shows a circuit diagram of a first embodiment of the further rectifier means FRTF to be used in a transponder IDT according to the invention. The circuit is the most elementary form of a rectifier circuit, which comprises a diode d1 which is connected between connection points 4 and 6, and a smoothing capacitor C1 which is connected between, on the one hand, connection point 6 and, on the other hand, the mutually interconnected connection points 5 and 7. There is a positive potential relative to the potential on connection point 7 on connection point 6. If so desired, the polarity of the diode d1 can be exchanged, so that the potential on connection point 6 is negative relative to the potential on connection point 7. Since a freewheeling diode D1 is already present elsewhere in the transponder IDT (see among other things FIG. 2), this freewheeling diode is no longer necessary in the circuit as shown in FIG. 3 in the case where diode d1 in FIG. 3 is connected to the polarity indicated. If there is a reverse polarity of diode d1 (to create a negative potential relative to connection point 7 on connection point 6), an additional freewheeling diode is needed. This additional freewheeling diode is indicated by d3 in FIG. 3 and is drawn in dashed lines between connection points 4 and 5. It should be observed that this additional freewheeling diode d3 is in fact connected in anti-parallel to the freewheeling diode D1 (see FIG. 2). Owing to the fact that (in FIG. 2) there is positive polarity on the electrically conductive pad P1 relative to the electrically conductive pad P2, the additional freewheeling diode d3 actually forms an undesired (loss) load at the input of the rectifier means RTF. Since the further rectifier means FRTF need to deliver relatively few currents (compared to the rectifier means RTF), also the dimension of the additional freewheeling diode d3 is relatively small compared to the dimension of the freewheeling diode D1. As a result, the loss of energy, which is caused by the additional freewheeling diode d3, is small.

Figure 4:
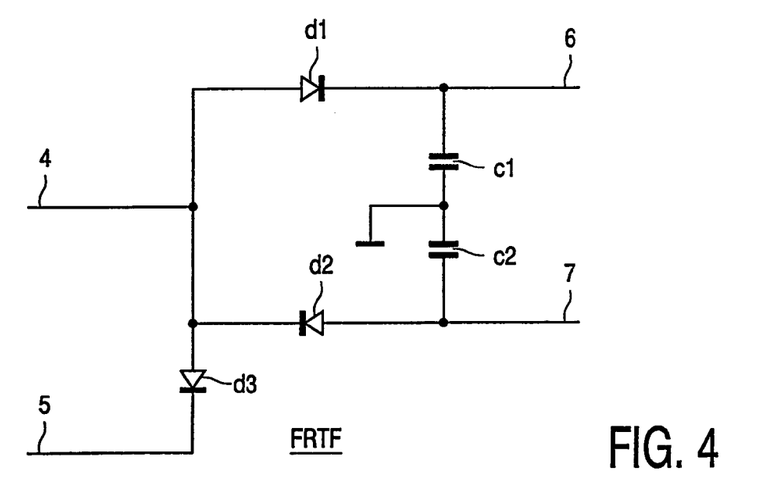
FIG. 4 shows a circuit diagram of a second embodiment of the further rectifier means to be used in a transponder according to the invention.

FIG. 4 shows a circuit diagram of a second embodiment of the further rectifier means FRTF to be used in a transponder IDT according to the invention. This circuit is in fact a dual arrangement of the circuit shown in FIG. 3 in which there is a positive potential relative to ground (=supply terminal 1 in FIG. 2) on connection point 6 and in which there is a negative potential relative to ground at connection point 7.

It should be observed that in a transponder IDT as shown in FIGS. 9 and 10 no freewheeling diode is needed because of the fact that coil L1 already establishes a DC connection to the inputs of the rectifier means RTF and the further rectifier means FRTF.

Figure 5:
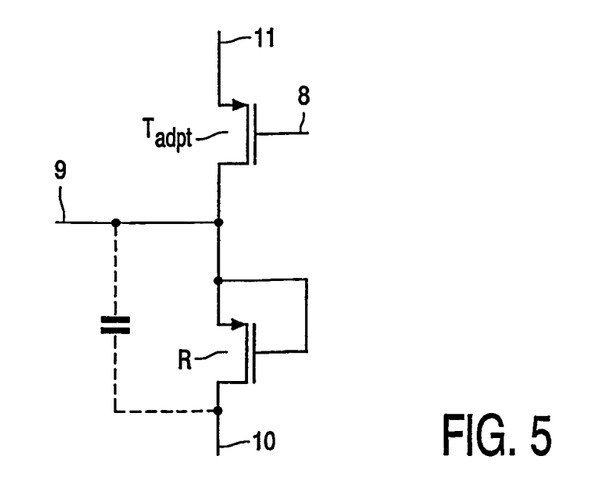
FIG. 5 shows a circuit diagram of an embodiment of the voltage adaptation means to be used in a transponder according to the invention.

FIG. 5 shows a circuit diagram of an embodiment of the voltage adaptation means VADPT to be used in a transponder according to the invention. The circuit comprises a series combination of a main current path of an adaptation transistor $T_{adpt}$ and a resistive element R. The resistive element R in this example is embodied in a P-type field effect transistor which is short-circuited by source and gate. A source of the adaptation transistor $T_{adpt}$ forms the connection point 11. A gate of the adaptation transistor $T_{adpt}$ forms the connection point 8. The common junction of a drain of the adaptation transistor $T_{adpt}$ and the resistive element R forms the connection point 9: The other side of the resistive element (drain) forms connection point 10. The gate of adaptation transistor $T_{adpt}$ receives the code signal from signal output terminal 3. In response thereto the adaptation transistor $T_{adpt}$ delivers a current through the resistive element R which current varies in accordance with the code signal. In consequence, the code signal with adapted voltage levels arises at connection point 9.

It should be observed that, referring to inter alia FIG. 2, there may be AC crosstalk between the source and gate of the modulation transistor TM. This AC crosstalk thus arises at the connection point 9 of the voltage adaptation means VADPT. This AC crosstalk may reduce the efficiency of the transponder IDT. To avoid this a capacitor which is shown in dashed lines in FIG. 5 may be inserted between connection points 9 and 10. The capacitance of this capacitor is to be chosen sufficiently large to sufficiently suppress the AC crosstalk. The capacitance cannot, however, be selected to have an arbitrary value because the code signal (with adapted voltage levels) must not be suppressed. The best capacitance may be established by experiments, for example by means of computer simulations.

It should be observed with reference to FIGS. 6, 8 and 10 that connection point 4 of the further rectifier means FRTF may also be connected to supply terminal 1 in lieu of supply terminal 2.

With respect to FIGS. 7 an 8 it should be observed that it has appeared that the modulation transistor Tm in this configuration operates less well as regards one of its functions, that is to say, the function of freewheeling diode D1 (see inter alia FIG. 2). To improve the operation of the transponder IDT in this configuration, a freewheeling diode can be connected in parallel with the main current path of the modulation transistor TM. This freewheeling diode is shown in dashed lines in FIGS. 7 and 8. The optimum surface of this freewheeling diode relative to the dimensions of the modulation transistor TM may be determined by means of computer simulations.

With respect to FIGS. 9 and 10 it should be observed that a tuning capacitor (shown in dashed lines) can be connected in parallel with the coil L1. As a result, a tuning may be made to the frequency of the RF signal, so that a larger efficiency is achieved.

Furthermore it should be observed for all embodiments that in lieu of one-sided rectification (for example diode D2) also two-sided rectification may be applied, for example by applying the generally known "Wien bridge" (4 diodes).

For the embodiments shown it holds that in lieu of a P type field effect transistor also N type field effect transistors can be used as modulation transistor TM. It is even possible to use bipolar transistors. Depending on the choice made the cathode and anode connection of diode D1 or diode D2 is to be exchanged and the polarity of the variable signals is to be adapted to the signal output terminal 3 and connection point 9. The diodes D1 or D2 may for example be designed with a transistor arranged as a diode.

Figure 11:
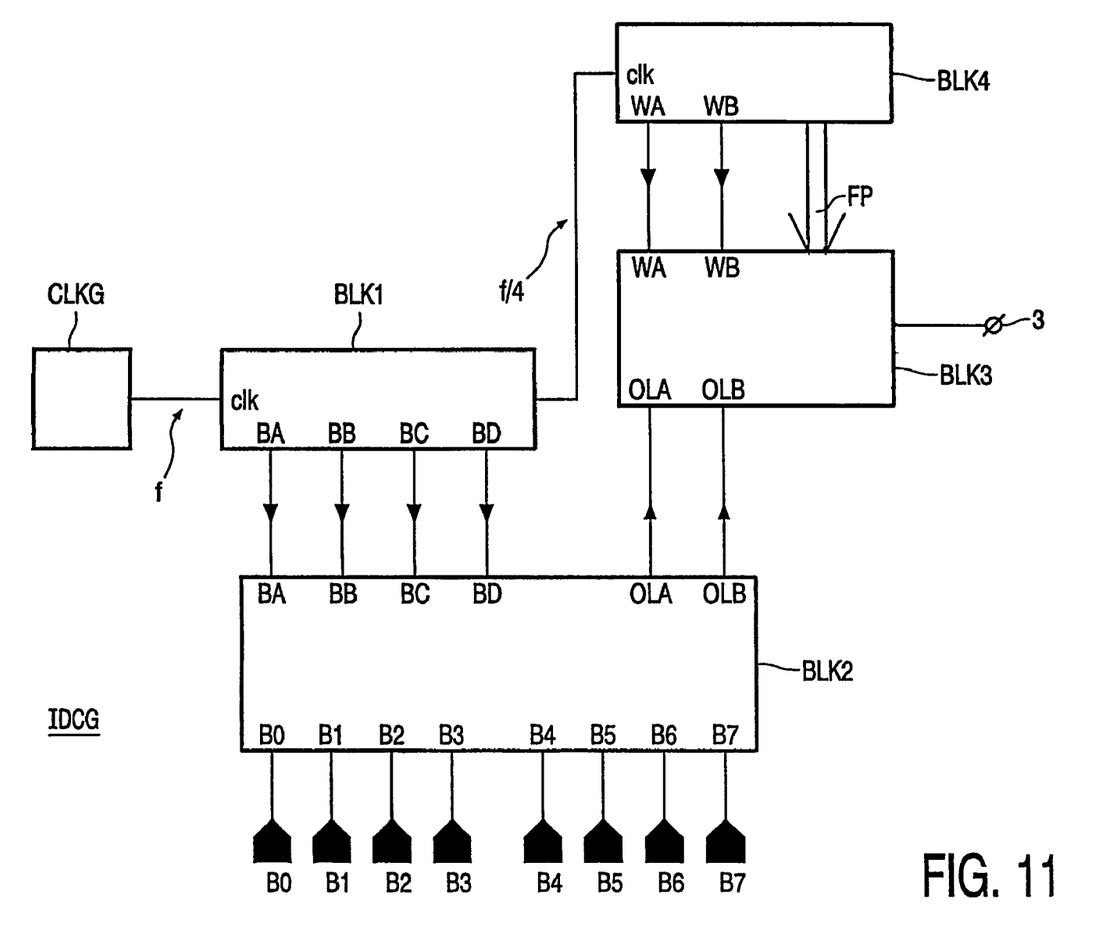
FIG. 11 shows an example of a circuit diagram of the identification code generation means which may be used in a transponder according to the invention.

FIG. 11 shows an example of a circuit diagram of the identification code generator IDCG. An identification code may for example be assembled by two words of four bits each, for example, as is shown with respect to block BLK2, which can receive two words of 4 bits, that is, the first word comprising B0 to B3 and the second word comprising B4 to B7. Block BLK1, which is controlled with a clock frequency f from the clock generator CLKG on the clock input clk, generates and sends binary signals BA, BB, BC, and BD to block BLK2. Under the control of the binary signal BA, bits B0 and B4 are transferred to the outputs OLA and OLB, respectively. Under the control of the binary signal BB, bits B1 and B5 are transferred to outputs OLA and OLB, respectively. Under the control of the binary signal BC, bits B2 and B6 are transferred to the outputs OLA and OLB, respectively. Under the control of the binary signal BD, bits B3 and B7 are transferred to the outputs OLA and OLB, respectively. The binary signals BA, BB, BC and BD are sequentially transferred to block BLK2. As a result, the first word is serially transferred from the output OLA of block BLK2 to the input OLA of block BLK3. At the same time the second word is transferred from the output OLB of block BLK2 to the input OLB of block BLK3. An output of block BLK1 is coupled with the clock input clk of block BLK4 for providing a clock frequency having a rate (f/4) which is a quarter of the clock frequency of block BLK1. Word selection signals WA and WB are sent from block BLK4 to block BLK3 to indicate which of the first or second word from block BLK2 is to be transferred to the signal output terminal 3. By sequentially activating the word signals WA and WB, first the first word is switched through to the signal output terminal 3 and then the second word to the signal output terminal 3, so that the bits B0 to B7 sequentially appear on the signal output terminal 3. Furthermore, fixed-pattern words FP are sequentially switched through to the signal output terminal 3. The purpose of these fixed-pattern words FP is to inform the base station BS when the first bit B0 commences and the last bit B7 ends. The fixed pattern may be, for example, a series of four logic zeros followed by a series of four logic ones. Other patterns may also be chosen, however, as long as the base station BS recognizes this pattern in some way or another.

The invention claimed is:

1. A transponder for supplying a code to a base station by varying a radio-frequency signal coming from the base station in a rhythm that corresponds to the code, the transponder comprising identification code generation means for generating the code; rectifier means which are arranged for AC coupling with a radio-frequency signal for applying a supply voltage to the generation means, and which rectifier means comprise at least one circuit acting as a rectifier; a modulation transistor having a main current path, and comprising a control electrode which is coupled for the reception of the code for producing a variable load of the rectifier means as a result of which the radio-frequency signal varies with said rhythm, the at least one circuit acting as a rectifier comprising the main current path of the modulation transistor, voltage adaptation means for adapting the voltage levels of the code and for supplying the code with the adapted voltage levels to the control electrode of the modulation transistor; and further rectifier means for applying a separate supply voltage to the voltage adaptation means.

2. A transponder as claimed in claim 1, characterized in that the voltage adaptation means comprise a series combination of a main current path of an adaptation transistor and a resistive element, which series combination is coupled for the reception of the separate supply voltage, and where a control electrode of the adaptation transistor is coupled for the reception of the code supplied by the identification code generation means and where a common junction of the adaptation transistor and the resistive element is coupled with the control electrode of the modulation transistor.

3. A transponder as claimed in claim 1, characterized in that the AC coupling is a capacitive coupling because the transponder comprises a first contact pad for a capacitive coupling with a first contact pad of the base station, and because the transponder comprises a second contact pad for capacitive coupling with a second contact pad of the base station, and in that the rectifier means comprise a circuit acting as a rectifier, not being the modulation transistor, which is coupled between the first contact pad of the transponder and the second contact pad of the transponder, and in that the main current path of the modulation transistor is connected in series with a supply terminal or the identification code generation means and in that the further rectifier means arc arranged for being coupled to the radio-frequency signal via the capacitive coupling.

4. A transponder as claimed in claim 1, characterized in that the AC coupling is a capacitive coupling because the transponder comprises a first contact pad for capacitive coupling with a first contact pad of the base station, and because the transponder comprises a second contact pad for capacitive coupling with a second contact pad of the base station, and in that the main current path of the modulation transistor is coupled between the first contact pad of the transponder and the second contact pad of the transponder, and in that the rectifier means comprise a circuit acting as a rectifier, not being the modulation transistor, which is coupled in series with a supply terminal of the generation means, and in that the further rectifier means are arranged for being coupled with the radio-frequency signal via the capacitive coupling.

5. A transponder as claimed in claim 1, characterized in that the AC coupling is an inductive coupling because die transponder comprises a coil for inductive coupling with a coil of the base station, the coil of the transponder is electrically coupled with the rectifier means and with the further rectifier means for the reception of the radio-frequency signal, and in that the main current path of the modulation transistor is coupled in series with a supply terminal of the identification code generation means.

6. A transponder as claimed in one of the preceding claims, characterized in that the transponder comprises electronic components which are mainly manufactured from one or more organic materials.

7. A transponder as claimed in claim 6, characterized in that at least one of the organic materials is a polymer.

* * * * *